(12) United States Patent
Jones et al.

(10) Patent No.: US 6,877,163 B1
(45) Date of Patent: Apr. 5, 2005

(54) METHOD AND SYSTEM FOR DYNAMIC PROXY CLASSES

(75) Inventors: Peter C. Jones, Winchester, MA (US); Ann M. Wollrath, Groton, MA (US); Robert W. Scheifler, Somerville, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/332,029

(22) Filed: Jun. 14, 1999

(51) Int. Cl.$^7$ ................................. G06F 9/00
(52) U.S. Cl. .................. 719/332; 719/331; 719/315; 719/316
(58) Field of Search ............... 719/331, 332, 719/315, 316; 709/315, 316; 707/103, 104

(56) References Cited

U.S. PATENT DOCUMENTS

| | | |
|---|---|---|
| 4,491,946 A | 1/1985 | Kryskow, Jr. et al. |
| 4,713,806 A | 12/1987 | Oberlander et al. |
| 4,809,160 A | 2/1989 | Mahon et al. |
| 4,823,122 A | 4/1989 | Mann et al. |
| 4,939,638 A | 7/1990 | Stephenson et al. |
| 4,956,773 A | 9/1990 | Saito et al. |
| 5,088,036 A | 2/1992 | Ellis et al. |
| 5,109,486 A | 4/1992 | Seymour |
| 5,187,787 A | 2/1993 | Skeen et al. |
| 5,218,699 A | 6/1993 | Brandle et al. |
| 5,257,369 A | 10/1993 | Skeen et al. |
| 5,293,614 A | 3/1994 | Ferguson et al. |
| 5,297,283 A | 3/1994 | Kelly, Jr. et al. |
| 5,311,591 A | 5/1994 | Fischer |
| 5,339,435 A | 8/1994 | Lubkin et al. |
| 5,386,568 A | 1/1995 | Wold et al. |
| 5,390,328 A | 2/1995 | Frey et al. |
| 5,423,042 A | 6/1995 | Jalili et al. |

(Continued)

FOREIGN PATENT DOCUMENTS

| | | |
|---|---|---|
| EP | 0 300 516 A1 | 1/1989 |
| EP | 0 351 536 A3 | 1/1990 |
| EP | 0 384 339 A3 | 8/1990 |
| EP | 0 472 874 A1 | 3/1992 |

(Continued)

OTHER PUBLICATIONS

"Java (TM) Remote Method Invocation Specification," Sun Microsystems, Inc., <java.sun.com/products/jdk1.2beta1>, 1997.

(Continued)

Primary Examiner—Meng-Al T. An
Assistant Examiner—The Thanh Ho
(74) Attorney, Agent, or Firm—Finnegan, Henderson, Farabow, Garrett & Dunner, L.L.P.

(57) ABSTRACT

In an object-oriented data processing system, methods and systems in accordance with the present invention provide a proxy class dynamically generated at runtime that implements a list of interfaces specified at runtime such that a method invocation through an interface on an instance of the class is encoded and dispatched uniformly to an object that performs the invocation of the requested method. The generation of the proxy class at runtime and the specification at runtime of the list of interfaces implemented by the proxy class allow the interfaces to be used to be chosen at runtime before generation of the proxy class. Since the proxy class does not need to be created before compile time, the interface list implemented by the proxy class does not need to be known at the time the source code is written.

8 Claims, 5 Drawing Sheets

U.S. PATENT DOCUMENTS

| | | |
|---|---|---|
| 5,440,744 A | 8/1995 | Jacobson et al. |
| 5,448,740 A | 9/1995 | Kiri et al. |
| 5,455,952 A | 10/1995 | Gjovaag |
| 5,471,629 A | 11/1995 | Risch |
| 5,475,792 A | 12/1995 | Stanford et al. |
| 5,475,817 A | 12/1995 | Waldo et al. |
| 5,481,721 A | 1/1996 | Serlet et al. |
| 5,504,921 A | 4/1996 | Dev et al. |
| 5,511,197 A | 4/1996 | Hill et al. |
| 5,524,244 A | 6/1996 | Robinson et al. |
| 5,553,282 A | 9/1996 | Parrish et al. |
| 5,555,367 A | 9/1996 | Premerlani et al. |
| 5,557,798 A | 9/1996 | Skeen et al. |
| 5,560,003 A | 9/1996 | Nilsen et al. |
| 5,561,785 A | 10/1996 | Blandy et al. |
| 5,577,231 A | 11/1996 | Scalzi et al. |
| 5,603,031 A | 2/1997 | White et al. |
| 5,617,537 A | 4/1997 | Yamada et al. |
| 5,628,005 A | 5/1997 | Hurvig |
| 5,640,564 A | 6/1997 | Hamilton et al. |
| 5,644,768 A | 7/1997 | Periwal et al. |
| 5,652,888 A | 7/1997 | Burgess |
| 5,655,148 A | 8/1997 | Richman et al. |
| 5,659,751 A | 8/1997 | Heninger |
| 5,671,225 A | 9/1997 | Hooper et al. |
| 5,675,796 A | 10/1997 | Hodges et al. |
| 5,680,573 A | 10/1997 | Rubin et al. |
| 5,680,617 A | 10/1997 | Gough et al. |
| 5,684,955 A | 11/1997 | Meyer et al. |
| 5,689,709 A | 11/1997 | Corbett et al. |
| 5,706,435 A | 1/1998 | Barbara et al. |
| 5,724,588 A | 3/1998 | Hill et al. |
| 5,727,145 A | 3/1998 | Nessett et al. |
| 5,737,607 A | 4/1998 | Hamilton et al. |
| 5,745,678 A | 4/1998 | Herzberg et al. |
| 5,745,695 A | 4/1998 | Gilchrist et al. |
| 5,745,703 A | 4/1998 | Cejtin et al. |
| 5,754,849 A | 5/1998 | Dyer et al. |
| 5,757,925 A | 5/1998 | Faybishenko |
| 5,761,656 A | 6/1998 | Ben-Shachar |
| 5,764,897 A | 6/1998 | Khalidi |
| 5,768,532 A | 6/1998 | Megerian |
| 5,774,551 A | 6/1998 | Wu et al. |
| 5,778,228 A | 7/1998 | Wei |
| 5,778,368 A | 7/1998 | Hogan et al. |
| 5,787,425 A | 7/1998 | Bigus |
| 5,787,431 A | 7/1998 | Shaughnessy |
| 5,790,548 A | 8/1998 | Sistanizadeh et al. |
| 5,805,885 A * | 9/1998 | Leach et al. ............... 395/683 |
| 5,809,507 A | 9/1998 | Cavanaugh, III |
| 5,813,013 A | 9/1998 | Shakib et al. |
| 5,815,149 A | 9/1998 | Mutschler, III et al. |
| 5,815,709 A | 9/1998 | Waldo et al. |
| 5,815,711 A | 9/1998 | Sakamoto et al. |
| 5,829,022 A | 10/1998 | Watanabe et al. |
| 5,832,529 A | 11/1998 | Wollrath et al. |
| 5,832,593 A | 11/1998 | Wurst et al. |
| 5,835,737 A | 11/1998 | Sand et al. |
| 5,842,018 A | 11/1998 | Atkinson et al. |
| 5,844,553 A | 12/1998 | Hao et al. |
| 5,845,129 A | 12/1998 | Wendorf et al. |
| 5,860,004 A | 1/1999 | Fowlow et al. |
| 5,860,153 A | 1/1999 | Matena et al. |
| 5,864,862 A | 1/1999 | Kriens et al. |
| 5,864,866 A | 1/1999 | Henckel et al. |
| 5,872,928 A | 2/1999 | Lewis et al. |
| 5,875,335 A | 2/1999 | Beard |
| 5,878,411 A | 3/1999 | Burroughs et al. |
| 5,884,024 A | 3/1999 | Lim et al. |
| 5,884,079 A | 3/1999 | Furusawa |
| 5,887,134 A | 3/1999 | Ebrahim |
| 5,890,158 A | 3/1999 | House et al. |
| 5,892,904 A | 4/1999 | Atkinson et al. |
| 5,933,497 A | 8/1999 | Beetcher et al. |
| 5,935,249 A | 8/1999 | Stern et al. |
| 5,940,827 A | 8/1999 | Hapner et al. |
| 5,946,485 A | 8/1999 | Weeren et al. |
| 5,946,694 A | 8/1999 | Copeland et al. |
| 5,966,531 A | 10/1999 | Skeen et al. |
| 6,002,867 A * | 12/1999 | Jazdzewski ................. 395/701 |
| 6,003,763 A | 12/1999 | Gallagher et al. |
| 6,009,103 A | 12/1999 | Woundy |
| 6,061,699 A | 5/2000 | DiCecco et al. |
| 6,061,713 A | 5/2000 | Bharadhwaj |
| 6,151,639 A * | 11/2000 | Tucker et al. ............... 709/316 |
| 6,269,373 B1 * | 7/2001 | Apte et al. ..................... 707/10 |
| 6,275,937 B1 * | 8/2001 | Hailpern et al. ............. 713/188 |
| 6,345,382 B1 * | 2/2002 | Hughes ......................... 717/1 |
| 6,385,661 B1 * | 5/2002 | Guthrie et al. .............. 719/316 |
| 6,442,619 B1 * | 8/2002 | Ouellette ..................... 709/316 |
| 6,549,955 B2 * | 4/2003 | Guthrie et al. .............. 719/315 |
| 6,578,191 B1 * | 6/2003 | Boehme et al. ............. 717/107 |

FOREIGN PATENT DOCUMENTS

| | | |
|---|---|---|
| EP | 0 474 340 A2 | 3/1992 |
| EP | 0 555 997 A2 | 8/1993 |
| EP | 0 565 849 A2 | 10/1993 |
| EP | 0 569 195 A3 | 11/1993 |
| EP | 0 603 880 A2 | 12/1993 |
| EP | 0 625 750 A2 | 11/1994 |
| EP | 0 635 792 A2 | 1/1995 |
| EP | 0 651 328 A1 | 5/1995 |
| EP | 0 660 231 A2 | 6/1995 |
| EP | 0 697 655 A2 | 2/1996 |
| EP | 0 718 761 A1 | 6/1996 |
| EP | 0 767 432 A2 | 4/1997 |
| EP | 0 778 520 A2 | 6/1997 |
| EP | 0 794 493 A2 | 9/1997 |
| EP | 0 803 810 A2 | 10/1997 |
| EP | 0 803 811 A2 | 10/1997 |
| EP | 0 805 393 A2 | 11/1997 |
| EP | 0 810 524 A1 | 12/1997 |
| EP | 0 817 020 A2 | 1/1998 |
| EP | 0 817 022 A2 | 1/1998 |
| EP | 0 817 025 A2 | 1/1998 |
| EP | 0 836 140 A2 | 4/1998 |
| GB | 2 253 079 A | 8/1992 |
| GB | 2 262 825 A | 6/1993 |
| GB | 2 305 087 A | 3/1997 |
| JP | 11-45187 | 2/1999 |
| WO | WO92/07335 A1 | 4/1992 |
| WO | WO92/09948 A1 | 6/1992 |
| WO | WO94/03855 A1 | 2/1994 |
| WO | WO96/03692 A1 | 2/1996 |
| WO | WO96/10787 A1 | 4/1996 |
| WO | WO96/18947 A1 | 6/1996 |
| WO | WO96/24099 A1 | 8/1996 |
| WO | WO98/02814 A1 | 1/1998 |
| WO | WO98/04971 A1 | 2/1998 |
| WO | WO /98/44414 | 10/1998 |

"Transparent Network Computing," Locus Computing Corporation, Jan. 5, 1995.

Agha et al., "Actorspaces: An Open Distributed Programming Paradigm," University of Illinois, Report No. UIUCDCS–R–92–1766, Open Systems Laboratory TR No. 8, pp. 1–12, Nov. 1992.

Ahmed et al., "A Program Building Tool for Parallel Applications," Yale University, pp. 1–23, Dec. 1, 1993.

Alexander et al., "Active Bridging," Proceedings of the ACM/SIGCOMM'97 Conference, Cannes, France, Sep. 1997.

Anderson et al., "Persistent Linda: Linda + Transactions + Query Processing," Proceedings of the 13th Symposium on Fault Tolerant Systems, pp. 93–109, 1991.

Anonymous, "Change–Notification Service for Shared Files," IBM Technical Disclosure Bulletin, vol. 36, No. 8, pp. 77–82, XP002108713, New York, US, Aug. 1993.

Anonymous, "Resource Preemption for Priority Scheduling," IBM Technical Disclosure Bulletin, vol. 16, No. 6, p. 1931, XP002109435 New York, US, Nov. 1973.

Beech et al., "Object Databases as Generalizations of Relational Databases," Computer Standards & Interfaces, vol. 13, Nos. 1/3, pp. 221–230, Amsterdam, NL, Jan. 1991.

Bertino et al., "Object–Oriented Database Management Systems: Concepts and Issues," Computer, vol. 24, No. 4, pp. 33–47, Los Alamitos, CA, Apr. 1991.

Betz et al., "Interoperable Objects: Laying the Foundation for Distributed Object Computing," Dr. Dobb's Journal, vol. 19, No. 11, p. 18(13), Oct. 1994.

Bevan et al., "An Efficient Reference Counting Solution To The Distributed Garbage Collection Problem," Parallel Computing, NL, Elsevier Science Publishers, Amsterdam, vol. 9, No. 2, pp. 179–192, Jan. 1989.

Birrell et al., "Distributed Garbage Collection for Network Objects," Digital Systems Research Center, No. 116, pp. 1–18, Dec. 15, 1993.

Birrell et al., "Grapevine: An Exercise in Distributed Computing," Communications of the ACM, vol. 25, No. 4, pp. 260–274, Apr. 1982.

Birrell et al., "Implementing Remote Procedure Calls," ACM Transactions on Computer Systems, vol. 2, No. 1, pp. 39–59, Feb. 1984.

Birrell et al., "Network Objects," DEC SRC Research Report 115, Feb. 28, 1994.

Birrell et al., "Network Objects," Operating Systems Review, 27(5), pp. 217–230, Dec. 1993.

Cannon et al., "Adding Fault–Tolerant Transaction Processing to LINDA," Software–Practice and Experience, vol. 24(5), pp. 449–466, May 1994.

Cardelli, "Obliq, A Lightweight Language For Network Objects," Digital SRC, pp. 1–37, Nov. 5, 1993.

Carriero et al., "Distributed Data Structures in Linda," Principles of Programming Language, pp. 1–16, 1986.

Carriero et al., "Distributed Data Structures in Linda," Yale Research Report YALEU/DCS/RR–438, Nov. 1985.

Chung et al., "A 'Tiny' Pascal Compiler: Part 1: The P–Code Interpreter," BYTE Publications, Inc., Sep. 1978.

Chung et al., "A 'Tiny' Pascal Compiler: Part 2: The P–Compiler," BYTE Publications, Inc., Oct. 1978.

Coulouris et al., "Distributed Systems Concepts and Designs," Second Ediition, Addison–Wesley, 1994.

Dave et al., "Proxies, Application Interface, And Distributed Systems," Proceedings International Workshop On Object Orientation In Operating Systems, pp. 212–220, Sep. 24, 1992.

Deux et al., "The O2 System," Communications Of The Association For Computing Machinery, vol. 34, No. 10, pp. 34–48, Oct. 1, 1991.

Dijkstra, "Self–stabilizing Systems in Spite of Distributed Control," Communications of the ACM, vol. 17, No. 11, pp. 643–644, Nov. 1974.

Dolev et al., "On the Minimal Synchronism Needed for Distributed Consensus," Journal of the ACM, vol. 34, No. 1, pp. 77–97, Jan. 1987.

Dourish, "A Divergence–Based Model of Synchrony and Distribution in Collaborative Systems," Xerox Technical Report EPC–1194–102, pp. 1–10, 1994.

Drexler et al., "Incentive Engineering for Computational Resource Management," The Ecology of Computation, Elsevier Science Publishers B.V., pp. 231–266, 1988.

Droms, "RFC 1541 Dynamic Host Configuration Protocol," <http://www.cis.ohio–state.edu/htbin/rfc/rfc1541.html>, pp. 1–33, Oct. 1993.

Emms, "A Definition Of An Access Control Systems Language," Computer Standards And Interfaces, vol. 6, No. 4, pp. 443–454, Jan. 1, 1987.

Gelernter et al., "Parallel Programming in Linda," Yale University, pp. 1–21, Jan. 1985.

Gelernter, "Generative Communication in Linda," ACM Transactions on Programming Languages and Systems, vol. 7, No. 1, pp. 80–112, Jan. 1985.

Gosling et al., "The Java (TM) Language Specification," Addison–Wesley, 1996.

Gottlob et al., "Extending Object–Oriented Systems with Roles," ACM Transactions On Information Systems, vol. 14, No. 3, pp. 268–296, Jul. 1996.

Gray et al., "Leases: An Efficient Fault–Tolerant Mechanism for Distributed File Cache Consistency," ACM, pp. 202–210, 1989.

Guth, "JavaOne: Sun to Expand Java Distributed Computing Effort," <http://www.sunworld.com/swol–02–1998/swol–02–sunspots.html>, XP–002109935, P.1, Feb. 20, 1998.

Hamilton et al., "Subcontract: A Flexible Base For Distributed Programming," Proceedings of 14th Symposium of Operating System Principles, Dec. 1993.

Hamilton, "Java and the Shift to Net–Centric Computing," Computer, pp. 31–39, Aug. 1996.

Harris et al., "Proposal for a General Java Proxy Class for Distributed Systems and Other Uses," Netscape Communications Corp., Jun. 25, 1997.

Hartman et al., "Liquid Software: A New Paradigm For Networked Systems," Technical Report 96–11, Department of Comp. Sci., Univ. of Arizona, Jun. 1996.

Howard et al., "Scale and Performance in a Distributed File System," ACM Transactions on Computer Systems, vol. 6, No. 1, pp. 51–81, Feb. 1988.

Hunt, "IDF: A Graphical Data Flow Programming Language for Image Processing and Computer Vision," Proceedings of the International Conference on Systems, Man, and Cybernetics, pp. 351–360, Los Angeles, Nov. 4–7, 1990.

IBM (TM) Technical Disclosure Bulletin, "Object Location Algorithm," vol. 36, No. 09B, pp. 257–258, Sep. 1993.

IBM (TM) Technical Disclosure Bulletin, "Retrieval of Qualified Variables Using Extendible Hashing," vol. 36, No. 12, pp. 301–303, Dec. 1993.

IBM, "Chapter 6—Distributed SOM (DSOM)," SOMobjects Developer Toolkit Users Guide, Version 2.1, pp. 6–1—6–90, Oct. 1994.

Jaworski, "Java 1.1 Developer's Guide, 2nd Edition," Sams.net, 1997.

Jones et al., "Garbage Collection: Algorithms for Automatic Dynamic Memory Management," pp. 165–175, John Wiley & Sons, 1996.

Kambhatla et al., "Recovery with Limited Replay: Fault-Tolerant Processes in Linda," Oregon Graduate Institute, Technical Report CSIE 90–019, pp. 1–16, Sep. 1990.

Kay et al., "An Overview of the Raleigh Object–Oriented Database System," ICL Technical Journal, vol. 7, No. 4, pp. 780–798, Oxford, GB, Nov. 1991.

Kougiouris et al., "Support for Space Efficient Object Invocation in Spring," Sep. 1994.

Krasner, "The Smalltalk–80 Virtual Machine," BYTE Publications Inc., pp. 300–320, Aug. 1991.

Lamport et al., "The Byzantine Generals Problem," ACM Transactions on Programming Languages and Systems, vol. 4, No. 3, pp. 382–401, Jul. 1982.

LINDA Database Search, pp. 1–68, Jul. 20, 1995.

Lindholm et al., "The Java (TM) Virtual Machine Specfication," Addison Wesley, 1996.

Liskov et al., "Distributed Object Management in Thor," International Workshop on Distributed Object Management, p. 12, 1992.

McDaniel, "An Analysis of a Mesa Instruction Set," Xerox Corporation, May 1982.

Mitchell et al., "An Overview of the Spring System," Feb. 1994.

Mullender, "Distributed Systems," Second Edition, Addison–Wesley, 1993.

Mummert et al., "Long Term Distributed File Reference Tracing: Implementation and Experience," Carnegie Mellon University School of Computer Science, pp. 1–28, Nov. 1994.

Orfali et al., "The Essential Distributed Objects Survival Guide," Chapter 11: Corba Commercial ORBs, pp. 203–215, John Wiley & Sons, Inc., 1996.

Ousterhout et al., "The Sprite Network Operating System," Computer, IEEE, pp. 23–36, Feb. 1988.

Pier, "A Retrospective on the Dorando, A High–Performance Personal Computer," IEEE Conference Proceedings, The 10th Annual International Symposium on Computer Architecture, 1983.

Pier, "A Retrospective on the Dorando, A High–Performance Personal Computer," Xerox Corporation, Aug. 1983.

Pinakis, "Using Linda as the Basis of an Operating System Microkernel," University of Western Australia, Department of Computer Science, pp. 1–165, Aug. 1993.

Riggs et al., "Pickling State in the Java (TM) System," USENIX Association Conference on Object–Oriented Technologies and Systems, XP–002112719, pp. 241–250, Jun. 17–21, 1996.

Rosenberry et al., "Understanding DCE," Chapters 1–3, 6, 1992.

Sharrott et al., "ObjectMap: Integrating High Performance Resources into a Distributed Object–oriented Environment," ICODP, 1995.

Thompson, "Regular Expression Search Algorithm," Communications of the ACM, vol. II, No. 6, p. 149 et seq., Jun. 1968.

Venners, "Jini Technology, Out of the Box," JAVAWORLD, 'Online!, pp. 1–4, Dec. 1998.

Waldo et al., "Events In An RPC Based Distributed System," Proceedings Of The 1995 USENIX Technical Conference, Proceedings USENIX Winter 1995 Technical Conference, New Orleans, LA, USA, 16–20, pp. 131–142, Jan. 1995.

Wilson et al., "Design of the Opportunistic Garbage Collector," Proceedings of the Object Oriented Programming Systems Languages And Applications Conference, New Orleans, vol. 24, No. 10, Oct. 1989.

Wu, "A Type System For An Object–Oriented Database System," Proceedings of the International Computer Software and Applications Conference (COMPSAC), Tokyo, Japan, pp. 333–338, Sep. 11–13, 1991.

Yemini et al., "Towards Programmable Networks," IFIP/IEEE International Workshop on Distributed Systems: Operations and Management, L'Aquila, Italy, Oct. 1996.

Yin et al., "Using Leases to Support Server Driven Consistency in Large–Scale Systems," Computer Services Department, University of Texas at Austin, p. 285–294, May 26–28, 1998.

Chambers, Craig, "An Efficient Implementation of SELF, a Dynamically–Typed Object–Oriented Language Based on Prototypes," OOPSLA '89 Proceedings, vol. 24, No. 10, pp. 49–70 (Oct. 1989) XP 000299230.

Gamma et al., "Design Patterns," Addison–Wesley, pp. 139–145, XP002159736.

Mezini, Mira, "Maintaining the Consistency of Class Libraries During Their Evolution," ACM 0–89791–908, vol. 32, No. 10, pp. 1–21 XP–000723417.

* cited by examiner

METHOD AND SYSTEM FOR DYNAMIC PROXY CLASSES

BACKGROUND

1. Field of the Invention

This invention generally relates to a data processing system and, more particularly, to a method and system in an object-oriented data processing system for generating proxy classes at runtime that implement a list of interfaces specified at runtime.

2. Related Art

Many computing systems use object-oriented programming to better accommodate the increasing complexity and cost of large computer programs. Object-orient programming languages have grown to be widely used due to their programming power and efficiency. In an object-oriented computing system, source code written in an object-oriented programming language, such as the Java™ programming language, typically contains a number of "classes," such as Java classes. A class is a template for creating objects that are "instances" of the class and are created from the template. A class contains both data members that store data and function members (or "methods") that act upon the data. Consequently, the class of an object defines its data and behavior, and the methods (function members) are typically used to both get and set the values for the data members in the class.

Additionally, object-oriented programming languages such as the Java programming language utilize "interfaces," which are simply lists of methods. An interface is similar to a class but typically only has declarations of its methods and typically does not provide implementation of those methods. An interface specifies methods supported by classes that implement the interface and declares what those methods should do. Classes, instances, interfaces and other aspects of object-oriented programming languages are discussed in detail in "The Java Programming Language", $2^{nd}$ Ed., Ken Arnold, James Gosling, Addison-Wesley, 1998, which is incorporated herein by reference. For further description of the Java language, refer to "The Java Language Specification," James Gosling, Bill Joy, Guy Steele, Addison-Wesley, 1996, which is also incorporated herein by reference.

When the source code for classes, interfaces and other aspects of an object-oriented programming language are created, they are usually written by a user and then compiled by a compiler on a computer so that the computer may run the source code. The source code is written and then compiled at a stage referred to as "compile-time." After the source code has been built and compiled, a computer system may then execute the source code at "runtime."

Since a class typically has to be built offline and then compiled, the interfaces implemented by that class must typically be known while the class is being built before runtime. Conventionally, to implement an interface by a class, the methods of the interface are determined during source code development before compile-time. For example, section 4.5 of Arnold and Gosling's "The Java Programming Language" describes an approach called "forwarding" to make a class use a second class for the implementation of one of its interfaces. This approach is simply to define every single method of the interface in the first class to delegate to the corresponding method in the second class. However, section 4.7 characterizes this approach as "tedious to implement and error-prone," which is further demonstrated by the fact that compile-time tools have been developed to automate the process of generating these forwarding methods.

Sometimes the interfaces that a user would like to implement may not be known or may be changing during the runtime of the program. As a result, it would be desirable to have a method and system that avoids the need to generate before runtime a class that implements a list of interfaces and avoids the need to write and compile code for each method of an interface being implemented.

Conventionally, to implement a single functionality on multiple interfaces of varying types, code needs to be created for each interface to carry out the functionality. It would also be desirable to not require the writing of specialized code for each one of multiple types of interfaces to facilitate a single functionality.

SUMMARY

Methods and systems consistent with the present invention provide a proxy class that is dynamically generated at runtime and that implements a list of interfaces specified at runtime. Method invocations on an instance of the proxy class are encoded and dispatched uniformly to another object that handles the method invocation. In accordance with the present invention, the proxy class generated at runtime does not require the implemented interfaces and their methods to be known before runtime, i.e., during development or at compile-time. Since no pre-generation of the class before runtime is required, the interfaces desired to be used may change during runtime before the creation of the proxy class. Additionally, the proxy class may provide uniform implementation of multiple types of interfaces without requiring specialized code for each one.

In accordance with methods and systems consistent with the present invention, a client may invoke a method of an interface implemented by the proxy class to an instance of the proxy class, and the proxy class instance encodes and dispatches the method to an invocation handler object associated with the proxy class instance that processes the method invocation and returns the result to the client via the proxy class instance.

In accordance with methods and systems consistent with the present invention, a method in a data-processing system generates at runtime a proxy class that implements one or more interfaces specified at runtime having methods, and creates an instance of the proxy class. Further, the proxy class instance receives a request to process a method of an interface, and dispatches the request to an invocation handler object that processes the request for the method.

DETAILED DESCRIPTION

In an object-oriented data processing system, methods and systems consistent with the present invention provide a proxy class, dynamically generated at runtime, that implements a list of interfaces specified at runtime. A method invocation through an interface on an instance of the class is encoded and dispatched uniformly regardless of the type of interface to an invocation handler object that performs the invocation of the requested method. Thus, in this manner, multiple interfaces may share the same code, which reduces wasteful duplication.

The dynamic generation of the proxy class at runtime and the specification at runtime of the list of interfaces and their methods supported by the proxy class allow the interfaces to be chosen after compile-time, but before the generation of the proxy class. Since the proxy class does not need to be created before compile time, the list of interfaces implemented by the proxy class does not need to be known at the time the source code is written, i.e., during development. Thus, a client that uses the proxy class to invoke methods on one or more interfaces is independent of the interfaces, so if different interfaces are selected, the client does not need to rebuild the proxy class. Moreover, as new interfaces are become available, the client may utilize them without modification.

The proxy class provides uniform access to the methods of the multiple types of interfaces implemented by the proxy class without regard to the type. If a client wishes to make a method invocation for a method of an interface implemented by the proxy class, the client may send the method invocation to an instance of the proxy class. The proxy class instance automatically encodes and dispatches a method invocation of a method on an interface implemented by the proxy class instance to an invocation handler object that automatically handles the request and returns the result. The invocation handler returns the result to the proxy class instance and then back to the client that made the original method invocation request.

The invocation handler is an object created by the client that is associated with the proxy class instance and processes the request received from the proxy class instance. The invocation handler is created to be application-specific and can be formed in a wide variety of ways depending on the application desired by the client.

For an example use of a dynamic proxy class, consider the following. A client may want to register to receive notification of events from a number of event generators, such as a windows manager and a device driver. However, each event generator typically may use a different interface and the programmer may not know at compile time what the interfaces may contain or even which interfaces the client may need at runtime. The dynamic proxy class in accordance with methods and systems consistent with the present invention solves this problem.

In using the dynamic proxy class, the client, at runtime, specifies the interfaces in which it is interested. That is, the client may receive an indication through the user interface or some other runtime mechanism which causes it to want to utilize a number of interfaces. So, the client invokes, for example, a Java Class Library (described below) call using a name or other identifier to obtain a class object representative of each desired interface. Then, the client utilizes another call to create a dynamic proxy class, which supports the interfaces. Lastly, the client instantiates the proxy class by providing it an invocation handler. Once the proxy class is instantiated, the instance of the proxy class implements the interfaces and can be registered, for example, with each of the event generators. Since the proxy object supports each of the event generator interfaces, each event generator recognizes the proxy object and can invoke the methods on the interface for that event generator. Furthermore, for every method invoked, the same invocation handler is invoked, thus needless duplication of code is prevented. This invocation handler performs common functionality for each of the methods. For instance, for each method invoked, representing the occurrence of an event, the invocation handler may log the event into a file. In this manner, the client need not know of the interfaces before runtime and can have common functionality used for a number of interfaces.

Although the example is described as using the proxy class by an entity other than the creator, one skilled in the art will appreciate that it may be beneficial for a client to both create and use the proxy class.

As another example, dynamic proxy classes may be applied to remote method invocations ("RMI") that allow objects executing on one computer to invoke method of an object on another computer. If a proxy class is to be used for the purpose of RMI on a remote server, the interfaces implemented by the dynamic proxy class might be a list of the methods available on the remote server, and the invocation handler might perform the function of forwarding the call to the location of a remote object. In this manner, the dynamic proxy class can be created using interface specifications received from a remote server at runtime, and the interface specifications need not be known beforehand at compile-time. In conventional systems, the proxy class is typically built offline, compiled and then downloaded before runtime, thereby reducing runtime flexibility.

Figure 1:
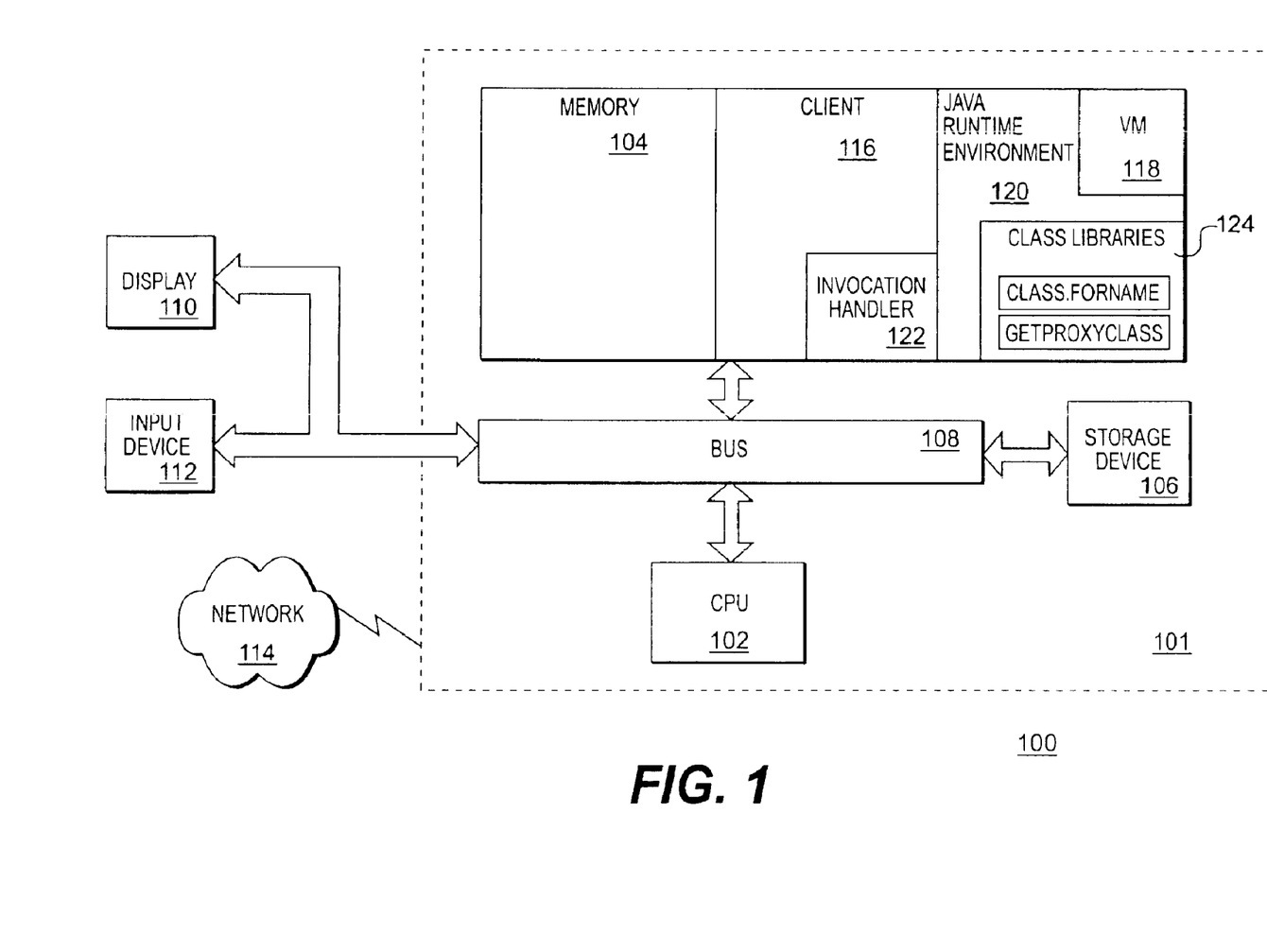
FIG. 1 depicts a data processing system suitable for use with methods and systems consistent with the present invention.

FIG. 1 depicts a data processing system 100 suitable for use with methods and systems consistent with the present invention. Data processing system 100 includes computer 101 interconnected to a network 114 such as the Internet, a wide area network ("WAN") or a local area network ("LAN"). Computer 101 includes a central processing unit (CPU) 102, a main memory 104, and a secondary storage device 106 interconnected via bus 108. Additionally, client computer 101 includes a display 210, and an input device 212. The computer 101 also includes a client 116, which may be any object, computational entity or program. The client 116 need not necessarily reside in memory 104 of computer 101 (e.g., it may be located elsewhere, possibly on another computer). Although only one computer 101 is shown, there may be many additional computers connected to network 114.

Main memory 104 also contains a virtual machine 118 ("VM"), such as a Java VM, which acts as an abstract computing machine, receiving instructions from programs in the form of byte codes and interpreting these byte codes by dynamically converting them into a form for execution, such as object code, and executing them. Java virtual machines are described in detail in "The Java Virtual Machine Specification," Lindholm and Yellin, Addison-Wesley, 1997, which is incorporated herein by reference. The memory also contains a runtime system, such as a Java Runtime Environment ("JRE") 120, which further contains class file libraries 124 which define classes used by programs running on the JRE. The class file libraries 124 contain definitions for "Class.forName" and "getProxyClass" methods which will be discussed below. The Class.forName function and other aspects of Java class libraries are described in detail in "The Java Class Libraries: An Annotated Reference," Chan and Lee, Addison-Wesley, 1997, which is incorporated herein by reference. Although Java components are discussed, methods and systems consistent with the present invention may utilize other types of components.

Figure 2:
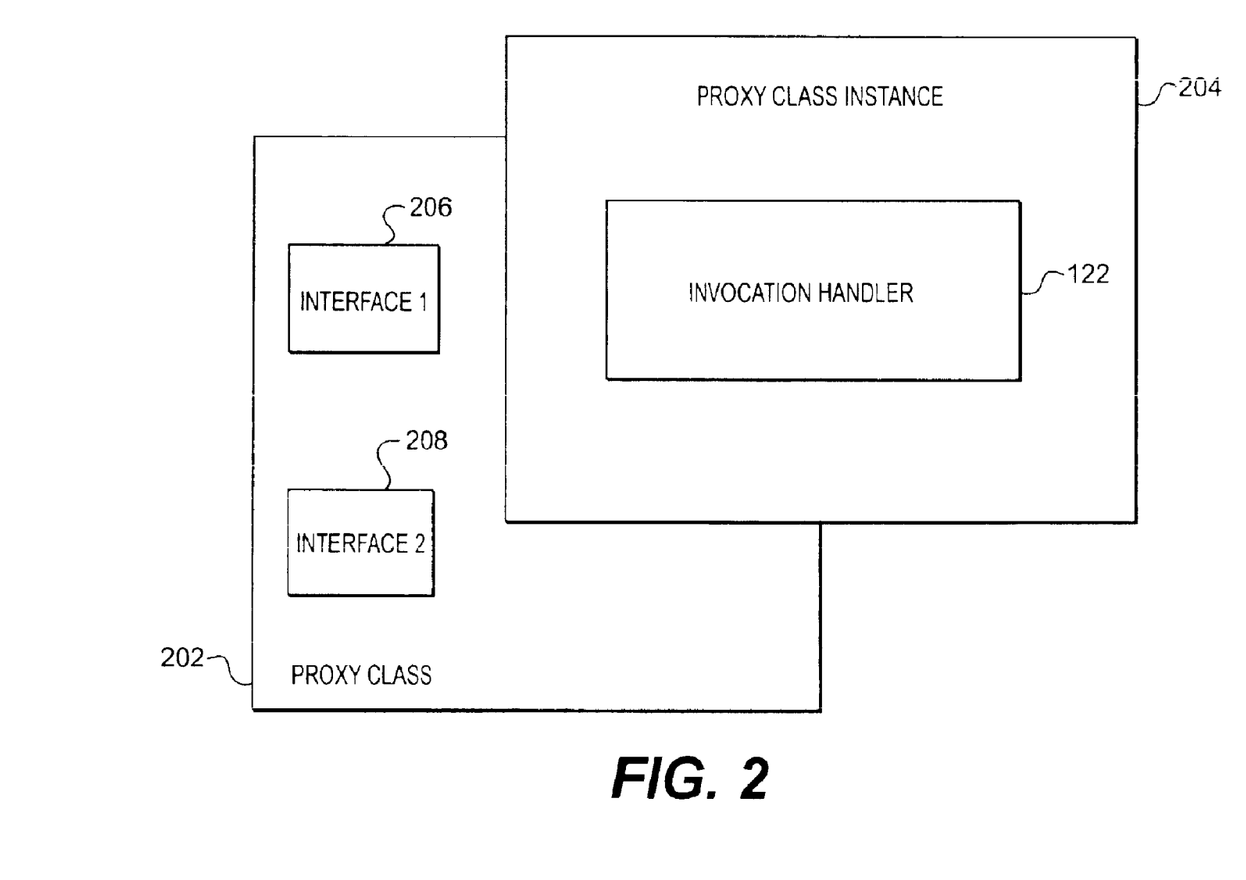
FIG. 2 depicts a proxy class and proxy class instance that implement the interfaces in accordance with methods and systems consistent with the present invention.

FIG. 2 depicts a proxy class 202 in a VM 118 which is generated at runtime and implements interfaces specified at runtime, such as interfaces 206 and 208, which include methods not shown on this diagram. In one implementation consistent with the present invention, another class (not shown) is used by the client 116 to generate the proxy class 202, and the client creates the proxy class by calling the getProxyClass method of the other class and passing representations of the desired interfaces as arguments to that method. Further, the client 116 creates an instance 204 of the proxy class 202 by giving the invocation handler 122 (described below) as an argument to the proxy class 202. The proxy class instance 204 can then be used by the client 116 or other entity to invoke a method of one of the interfaces implemented by the proxy class instance 204, such as interface 206 or 208.

The main memory 104 also contains an invocation handler 122 that is an object created by the client 116. The invocation handler 122 is created to be application-specific and may vary depending on the purpose of the proxy class 202. For example, in the event listener scenario, the invocation handler 122 performs the function of logging events to a file. As stated, the client 116 creates the proxy class instance 204 by passing the invocation handler 122 as an argument and thus is associated with the invocation handler 122 upon creation. When the proxy class instance 204 receives a method invocation request from a client 116, the proxy class instance 204 encodes and dispatches the method request to the invocation handler 122. The invocation handler 122 processes method invocations made to the proxy class instance 204 and returns a result to the proxy class instance to be returned to the client 116.

Although aspects of the present invention are described as being stored in memory or a VM, one skilled in the art will appreciate that these aspects can also be stored on or read from other types of computer-readable media, such as secondary storage devices, like hard disks, floppy disks, or CD-ROM; a carrier wave from a network, such as the Internet; or other forms of RAM or ROM either currently known or later developed. Sun, Sun Microsystems, the Sun logo, Java™, and Java™-based trademarks are trademarks or registered trademarks of Sun Microsystems, Inc. in the United States and other countries.

Figure 3:
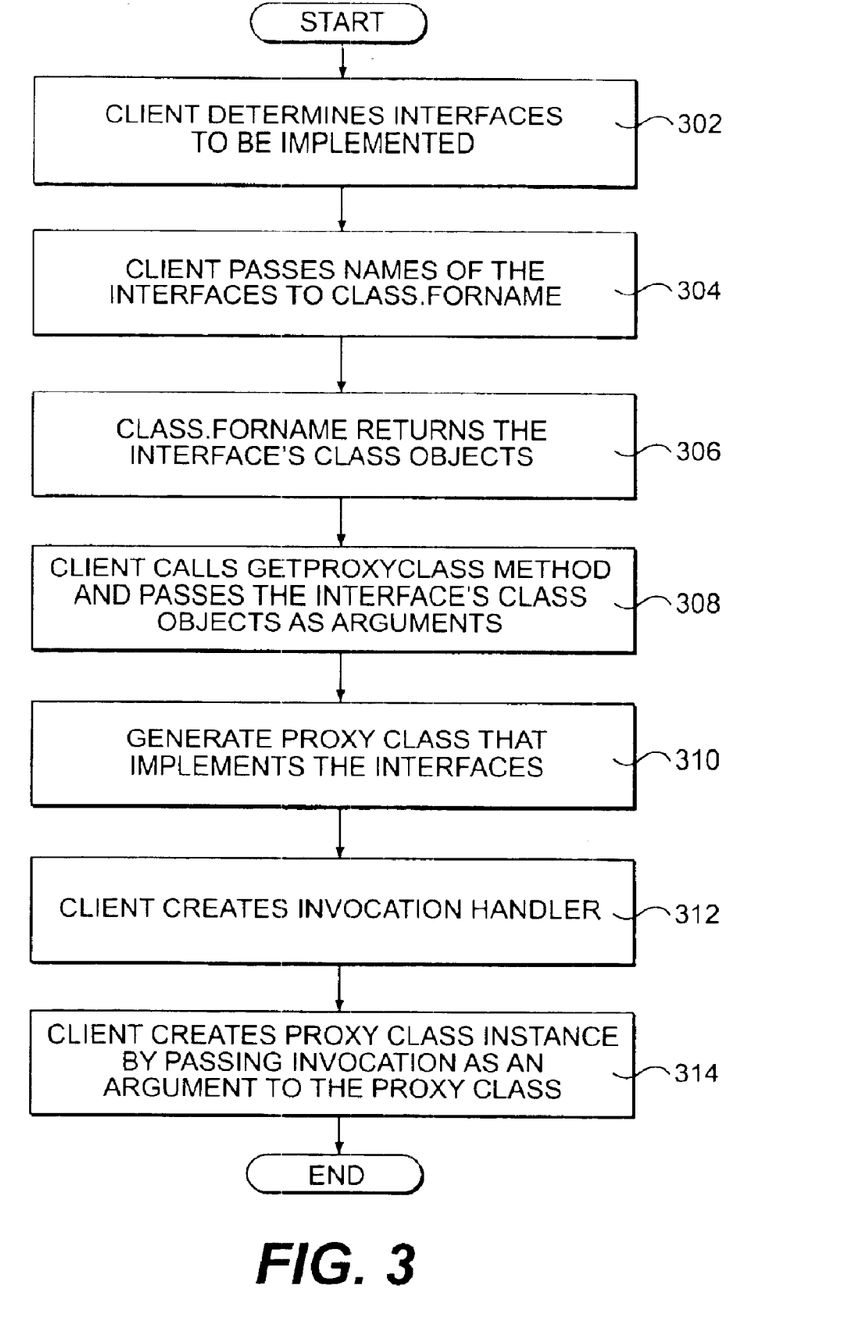
FIG. 3 depicts a flowchart illustrating steps used in a method for generating a proxy class, a proxy class instance, and an invocation handler at runtime consistent with the present invention.

FIG. 3 is a flowchart illustrating steps used in a method for generating a proxy class 202 and a proxy class instance 204. It should be appreciated that, in one implementation consistent with the present invention, the steps occur at runtime, i.e., after development of the source code and compile-time. A client 116 generating a proxy class 202 at runtime determines the interfaces that will be supported by the proxy class 202 (step 302), and this determination may be made at runtime by the client 116 and will depend on the purposes for which the proxy class will be used, such as for event listener applications as mentioned above. In the example shown in FIG. 2, the proxy class 202 supports the interfaces 206 and 208.

In one implementation consistent with the present invention, once the interfaces 206 and 208 to be implemented are determined, using the names of the interfaces, a client 116 may call a function such as the Class.forName function to obtain the "Class Objects" of the desired interfaces (step 304). The Class Objects are representations of the interfaces 206 and 208 and are used as the arguments for the getProxyClass method. Given the names of the desired interfaces 206 and 208, the Class.forName method returns the Class Objects of the required interfaces (step 306).

Once the client 116 has the Class Objects of the desired interfaces 206 and 208, it may generate a proxy class 202 for the interfaces by calling the getProxyClass method using the interface's Class Objects as arguments (step 308). The getProxyClass method returns a proxy class 202 that implements the interfaces 206 and 208 (step 310). To this end, the getProxyClass method generates custom code for each method of the interfaces that will encode and dispatch a method invocation to the invocation handler 122 including the arguments. This process is described below in further detail in FIG. 4. The client also creates the invocation handler 122 that will carry out the desired functionality of a call to an instance 204 of the proxy class 202 (step 312). The client then creates a proxy class instance 204 by calling the constructor of the proxy class 202 with the invocation handler 122 as an argument (step 314).

Figure 4:
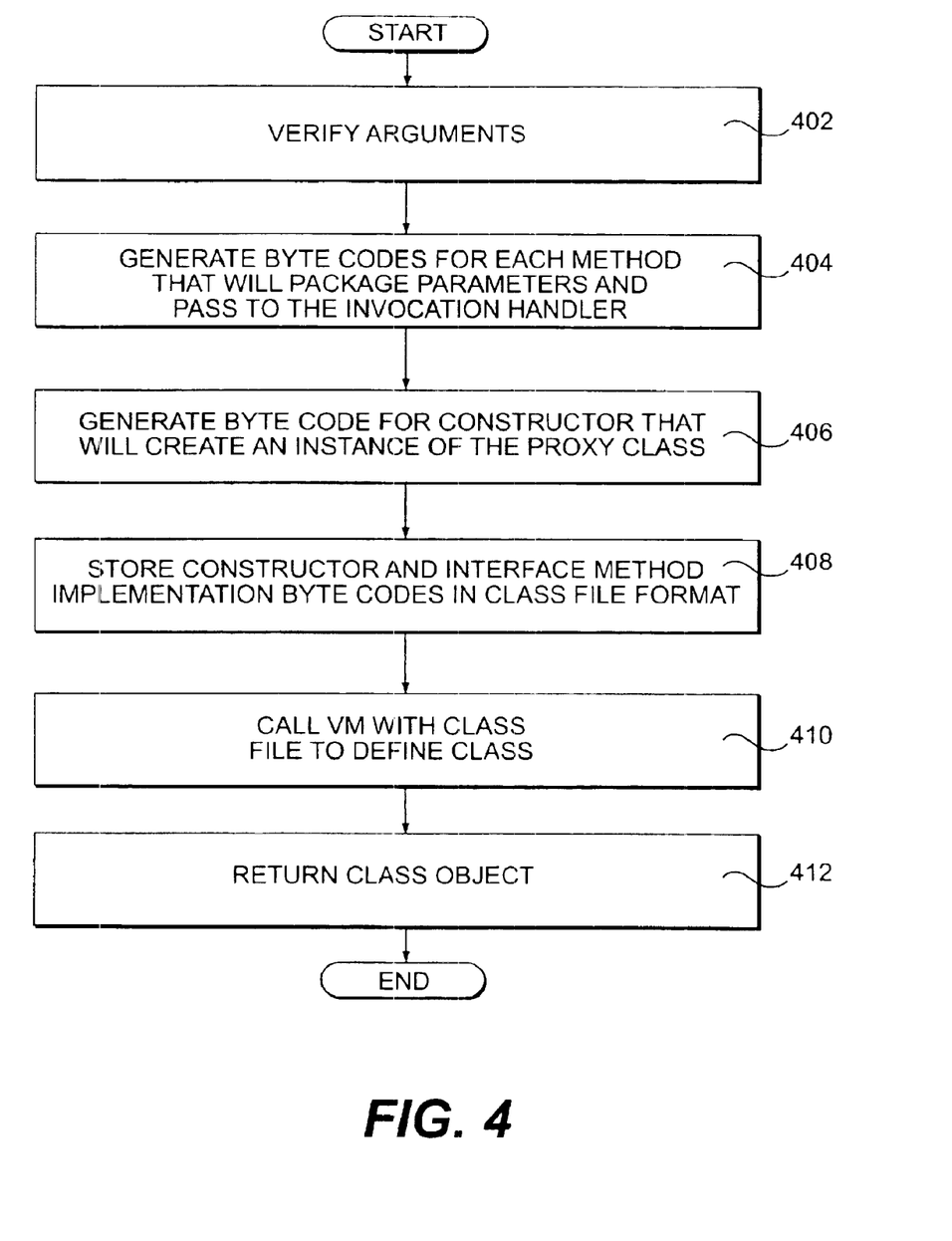
FIG. 4 depicts a flowchart illustrating steps used in a method for creating and returning a proxy class given a list of interfaces consistent with the present invention.

FIG. 4 depicts a flowchart illustrating steps used in a method for returning a proxy class given a list of interfaces. Consistent with the present invention, the steps illustrated in FIG. 4 are performed by the getProxyClass method invoked by the client 116. When the client 116 invokes this method with the Class Objects for the interfaces 206 and 208 to be implemented, the method verifies the arguments to make sure that they are valid (step 402). For each method of the interfaces 206 and 208 received as arguments, it generates byte codes that will package parameters and pass them to the invocation handler 122 (step 404). Then, the getProxyClass method creates the code for the constructor that will create an instance 204 of the proxy class 202 (step 406). Next, it stores the constructor and the byte codes in a class file format (step 408). Using the class file, the getProxyClass method then requests the VM 118 to define the class so that it is a valid class that is recognizable by the VM so that the VM will allow clients to instantiate it (step 410). Finally, the getProxyClass method returns the proxy class 202 (step 412).

Figure 5:
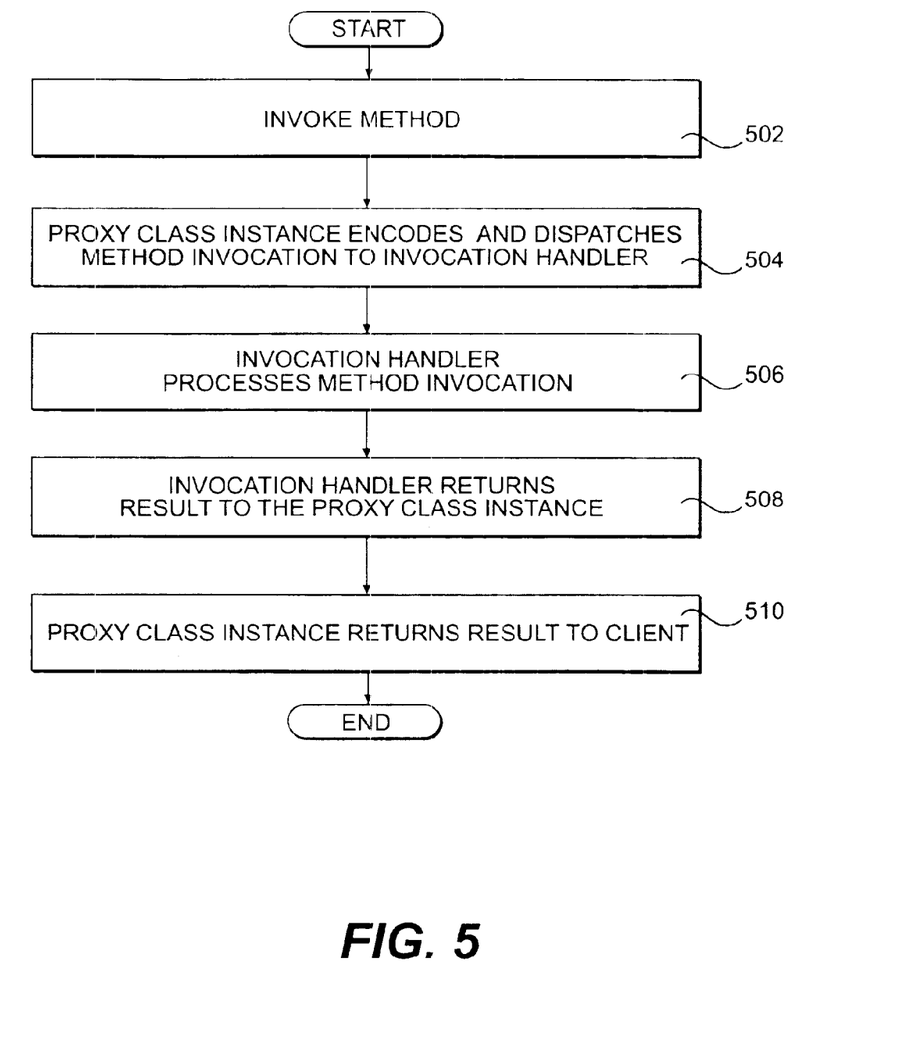
FIG. 5 depicts a flowchart illustrating the steps used in a method for making a method invocation on an instance of a proxy class generated at runtime in accordance with methods and systems consistent with the present invention.

FIG. 5 is a flowchart illustrating steps used in a method for making a method invocation on an instance 204 of a proxy class 202 generated at runtime in accordance with methods and systems consistent with the present invention. Once a caller has access to the proxy class instance 204, the caller may wish to invoke a method (step 502). For example, in the event listener example, an event generator may wish to log a window manager event or other type of event so it invokes a method on one of the interfaces 206 or 208 supported by the proxy class instance 204. Upon invocation, the proxy class instance 204 encodes and dispatches the method invocation to the invocation handler 122 (step 504). The invocation handler 122 then processes the method invocation using its predetermined functionality and obtains the result (step 506). For example, in this step, the invocation handler 122 may log an event reflected by the parameters. The invocation handler 122 then returns the result to the proxy class instance 204 (step 508) which then returns the result back to the caller (510).

As a result, methods and systems in accordance with the present invention allow a proxy class to be generated at runtime that can implement interfaces specified at runtime thereby avoiding a need for pre-generation of the proxy class and predetermination of the interfaces before runtime. They also facilitate the processing of method invocations to a single object that uniformly handles method invocations of varying types of multiple interfaces.

The following code contains portions of commented code that outlines a class that may be used for the creation of a proxy class written in the Java programming language.

Proxy classes, as well as instances of them, may be created using the static methods of the this class (note that the javadoc in the code presented here is not specification-complete):

package java.lang.reflect;

```
/**
 * The Proxy class provides static methods for dynamically creating
 * a class that implements a specified list of interfaces. Method
 * invocations through those interfaces on instances of the dynamically
 * created proxy class are encoded and dispatched to a special invocation
 * handler object supplied during creation of the proxy instance. The
 * invocation handler is an instance of the InvocationHandler interface.
 *
 * To create a proxy for some interface Foo:
 *
 *     InvocationHandler handler = new MyInvocationHandler(...);
 *     Class proxyClass = Proxy.getProxyClass(
 *         Foo.class.getClassLoader( ), new Class[ ] { Foo.class });
 *     Foo f = (Foo) proxyClass.
 *         getConstructor(new Class[ ] { InvocationHandler.class}).
 *         newInstance(new Object[ ] { handler });
 *
 * or more simply:
 *
 *     Foo f = (Foo) Proxy.newProxyInstance(Foo.class.getClassLoader( ),
 *                                  new Class[ ] {Foo.class}, handler);
 * A proxy instance created via reflection on the proxy class or via the
 * new Proxy Instance static method can be cast to any of the interfaces
 * specified when the proxy class was created.
 * When an interface method is invoked on the proxy, the method call is
 * dispatched t the invocation handler's invoke method, passing the
 * proxy instance, the java.lang.reflect.Method object for the interface
 * method, and an array containing the arguments passed:
 *
 *     handler.invoke (proxy, method, args);
 *
 * The handler processes the method invocation as appropriate and the
 * result it returns will then be returned to the caller of the proxy.
 */
public class Proxy implements java.io.Serializable {
    protected InvocationHandler h;
    protected Proxy (InvocationHandler h) {
      this.h = h;
    }
    /**
     * Returns a class that implements the specified interfaces.
     * A class is dynamically created if one does not already exist.
     *
     * @param    loader the class loader to define the proxy class in
     * @param    interfaces the list of interfaces for the proxy class to implement
     * @return   the specified dynamic proxy class
     * @throws   IllegalArgumentException if the arguments do not identify
     *                   a valid proxy class
     */
     * public static Class getProxyClass (ClassLoader loader, Class [ ] interfaces)
    throws IllegalArgumentException
    {
        // returns proxy class that implements interfaces
    }
    /**
     * Returns an instance of a proxy class that implements the
     * specified interfaces and dispatches method invocations to
     * the specified handler. This method is equivalent to:
     *
     *     Proxy.getProxyClass (loader, interfaces).
     *              getConstructor (new Class[ ] {InvocationHandler.class }).
     *              newInstance (new Object { ] { handler });
     * @param    loader the class loader to define the proxy class in
     * @param    interfaces the list of interfaces for the proxy class
     *                   to implement
```

```
 * @param    handler the handler to dispatch proxy invocations to
 * @return   the specified dynamic proxy class
 * @throws   IllegalArgumentException if the arguments do not
 *           identify a valid proxy class
 */
public static Object newProxyInstance (ClassLoader loader,
                                       Class [ ] interfaces,
                                       InvocationHandler handler)
    throws IllegalArgumentException
{
    // returns instance of specified proxy class
}
/**
 * Returns true if and only if the specified class was dynamically
 * generated to be a proxy class using the getProxyClass
 * method or the newProxyInstance method.
 *
 * param     cl class to test
 * @return   true if the class is a proxy class and false otherwise
 */
public static boolean isProxyClass (Class cl) {
    // returns true if class is a dynamic proxy class
}
/** Returns the invocation handler of the specified proxy instance.
 *
 * @param    proxy the proxy instance to return invocation handler of
 * @return   the invocation handler of the proxy instance
 * @throws   IllegalArgumentException if the argument is not a
 *           proxy instance
 */
public static InvocationHandler getInvocationHandler (Object proxy)
    throws IllegalArgumentException
{
    // returns invocation handler for proxy instance
}
}
/* InvocationHandler is used in conjunction with a proxy instance. When a
 * method is invoked on a proxy instance, the method invocation
 * is encoded and dispatched to the invoke method of its associated
 * InvocationHandler instance.
 */
public interface InvocationHandler {
    /**
     * Processes a proxied method invocation and returns a result.
     */
    Object invoke(Object proxy, Method method, Object[ ] args)
        throws Throwable;
}
```

The foregoing description of an implementation of the invention has been presented for purposes of illustration and description. It is not exhaustive and does not limit the invention to the precise form disclosed. Modifications and variations are possible in light of the above teaching or may be acquired from practicing of the invention. The scope of the invention is defined by the claims and their equivalents.

What is claimed is:

1. A method in a data processing system comprising the steps of:

specifying, by a first processing entity at runtime, an interface that is not referenced by the first processing entity, the interface having a method;

generating, at runtime, a class that implements the interface;

creating, by the first processing entity, an instance of the class;

receiving by the class instance a request from a second processing entity to process the method of the interface, wherein the second processing entity has a reference to the interface;

dispatching the request to an object to facilitate processing of the method of the interface; and returning a result of the processed method by the object to the second processing entity.

2. The method of claim 1, wherein the step of generating a class further includes the step of:

generating at runtime a class that implements a set of interfaces specified at runtime, each interface having one or more methods, wherein at least one of the interfaces in the set of interfaces is not referenced by the first processing entity and is referenced by the second processing entity.

3. The method of claim 1, wherein the step of creating an instance further includes the step of:

specifying an object to process method invocations on the instance.

4. A computer-readable medium containing instructions for controlling a data processing system to perform a method comprising the steps of:

specifying, by a first processing entity at runtime, an interface that is not referenced by the first processing entity, the interface having a method;

generating, at runtime, a class that implements the interface;

creating, by the first processing entity, an instance of the class;

receiving by the class instance a request from a second processing entity to process the method of the interface, wherein the second processing entity has a reference to the interface;

dispatching the request to an object to facilitate processing of the method of the interface; and returning a result of the processed method by the object to the second processing entity.

5. The computer-readable medium of claim 4, wherein the step of generating a class further includes the step of:

generating at runtime a class that implements a set of interfaces specified at runtime, each interface having one or more methods, wherein at least one of the interfaces in the set of interfaces is not referenced by the first processing entity and is referenced by the second processing entity.

6. The computer-readable medium of claim 4, wherein the step of creating an instance further includes the step of:

specifying an object to process method invocations on the instance.

7. A method in a data-processing system having a proxy class implementing interfaces specified at runtime, the interfaces containing methods, the system further having an instance of the proxy class and an invocation handler object for executing the methods contained by the interfaces, the method comprising the steps of:

determining, by a processing entity, a first set of interfaces to be implemented by the proxy class, wherein the first set of interfaces are not referenced by the processing entity;

generating at runtime the proxy class implementing the first set of interfaces;

receiving a request by an instance of the proxy class to invoke a method of an interface included in the first set of interfaces implemented by the proxy class;

dispatching the request to the invocation handler object;

returning a value from the invocation handler object to the proxy class instance; and returning the value from the proxy class instance to the processing entity.

8. A data-processing system comprising:

means for specifying, by a first processing entity at runtime, an interface that is not referenced by the first processing entity, the interface having a method;

means for generating, at runtime, a class that implements the interface;

means for creating, by the first processing entity, an instance of the class;

means for receiving by the class instance a request from a second processing entity to process the method of the interface, wherein the second processing entity has a reference to the interface;

means for dispatching the request to an object to facilitate processing of the method of the interface; and means for returning a result of the processed method by the object to the second processing entity.

* * * * *